(12) United States Patent
Fukasawa

(10) Patent No.: US 11,863,063 B2
(45) Date of Patent: Jan. 2, 2024

(54) POWER CONVERSION SYSTEM THAT PERFORMS INITIAL CHARGING OF A DIRECT-CURRENT CAPACITOR FROM AN ALTERNATE-CURRENT POWER SUPPLY

(71) Applicant: TOSHIBA MITSUBISHI-ELECTRIC INDUSTRIAL SYSTEMS CORPORATION, Chuo-ku (JP)

(72) Inventor: Issei Fukasawa, Tokyo (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 195 days.

(21) Appl. No.: 17/284,637

(22) PCT Filed: Jul. 16, 2019

(86) PCT No.: PCT/JP2019/027928
§ 371 (c)(1),
(2) Date: Apr. 12, 2021

(87) PCT Pub. No.: WO2021/009848
PCT Pub. Date: Jan. 21, 2021

(65) Prior Publication Data
US 2021/0399627 A1   Dec. 23, 2021

(51) Int. Cl.
*H02M 1/36* (2007.01)
*H02M 7/483* (2007.01)
(Continued)

(52) U.S. Cl.
CPC .............. *H02M 1/36* (2013.01); *H02M 1/32* (2013.01); *H02M 3/33569* (2013.01); *H02M 7/4835* (2021.05)

(58) Field of Classification Search
CPC ........ H02M 1/36; H02M 7/4835; H02M 1/32; H02M 3/33569
See application file for complete search history.

(56) References Cited

U.S. PATENT DOCUMENTS

2005/0259370 A1\* 11/2005 Kubo .................... G01R 31/52
361/42
2010/0320842 A1   12/2010 Beck
(Continued)

FOREIGN PATENT DOCUMENTS

CN    104300777 A    1/2015
EP    2 955 827 A1   12/2015
(Continued)

OTHER PUBLICATIONS

International Search Report dated Sep. 24, 2019 in PCT/JP2019/027928 filed on Jul. 16, 2019, citing documents AA, AB and AO-AR therein, 2 pages.
(Continued)

*Primary Examiner* — Rafael O De Leon Domenech
(74) *Attorney, Agent, or Firm* — Oblon, McClelland, Maier & Neustadt, L.L.P.

(57) ABSTRACT

A power conversion system includes: a power converter connected to an alternate-current power supply; a direct-current capacitor connected to a direct-current side of the power converter; a first alternate-current switch connected between the power converter and the alternate-current power supply; an inrush current suppressor connected in parallel to the first alternate-current switch, between the power converter and the alternate-current power supply, and including a charging resistance or a charging reactor; a second alternate-current switch connected in parallel to the first alternate-current switch and in series to the inrush current suppressor, between the power converter and the alternate-current power supply; and a control device configured to control the power converter so that the first alternate-current switch is open, the second alternate-current switch is closed, and a voltage applied to the direct-current capacitor reaches a voltage that is equal to or exceeds a preset voltage.

4 Claims, 6 Drawing Sheets

(a)

(b)

(c)

(51) Int. Cl.
  *H02M 1/32* (2007.01)
  *H02M 3/335* (2006.01)

(56) References Cited

U.S. PATENT DOCUMENTS

| | | | |
|---|---|---|---|
| 2015/0043253 A1* | 2/2015 | Awane | H02M 5/4585 363/126 |
| 2015/0061376 A1* | 3/2015 | Hartl | B60L 1/02 307/116 |
| 2015/0364939 A1 | 12/2015 | Talja et al. | |
| 2015/0365010 A1 | 12/2015 | Abe et al. | |
| 2015/0380942 A1 | 12/2015 | Premm et al. | |
| 2016/0089998 A1 | 3/2016 | Thömmes | |
| 2016/0233787 A1 | 8/2016 | Matsuoka et al. | |
| 2019/0044377 A1* | 2/2019 | Toyoda | H02J 9/062 |
| 2020/0235664 A1* | 7/2020 | Takei | H02M 7/537 |

FOREIGN PATENT DOCUMENTS

| | | |
|---|---|---|
| JP | 9-205740 A | 8/1997 |
| JP | 2004-147465 A | 5/2004 |
| JP | 2016-1956 A | 1/2016 |
| WO | WO 2015/056309 A1 | 4/2015 |

OTHER PUBLICATIONS

Extended European Search Report dated Dec. 21, 2022 in European Patent Application No. 19937499.2, citing references 1-4 and 15 therein, 8 pages.
English translation of International Preliminary Report on Patentability and Written Opinion dated Jan. 27, 2022 in PCT/JP2019/027928, 12 pages.
Indian Office Action dated Mar. 4, 2022 in Indian Patent Application No. 202117017126, 4 pages.
Office Action dated Sep. 11, 2023, in Chinese Patent Application No. 201980067416.6 w/English-language Translation.

* cited by examiner

POWER CONVERSION SYSTEM THAT PERFORMS INITIAL CHARGING OF A DIRECT-CURRENT CAPACITOR FROM AN ALTERNATE-CURRENT POWER SUPPLY

FIELD

The present invention relates to a power conversion system that alternate-current power to direct-current power or direct-current power to alternate-current power or compensates reactive power of an alternate-current power supply.

BACKGROUND

Patent Literature 1 discloses a power conversion system. The power conversion system enables performing initial charging of a direct-current capacitor while suppressing inrush current.

CITATION LIST

Patent Literature

[PTL 1] JP 2016-1956 A

SUMMARY

Technical Problem

However, in the power conversion system described in Patent Literature 1, a charging resistance is necessary for initial charging of a direct-current capacitor. In this case, a charging resistance having a high rating is needed for suppressing inrush current.

The present invention has been made in order to solve the aforementioned problem. An object of the present invention is to provide a power conversion system that enables performing initial charging of a direct-current capacitor while suppressing inrush current without using a component having a high rating.

Solution to Problem

A power conversion system according to the present invention includes: a power converter connected to an alternate-current power supply; a direct-current capacitor connected to a direct-current side of the power converter; a first alternate-current switch connected between the power converter and the alternate-current power supply; an inrush current suppressor connected in parallel to the first alternate-current switch, between the power converter and the alternate-current power supply, the inrush current suppressor including a charging resistance or a charging reactor; a second alternate-current switch connected in parallel to the first alternate-current switch and in series to the inrush current suppressor, between the power converter and the alternate-current power supply; and a control device configured to control the power converter so that the first alternate-current switch is open, the second alternate-current switch is closed and a voltage applied to the direct-current capacitor reaches a voltage that is equal to or exceeds a preset voltage.

Advantageous Effects of Invention

The present invention thus enables performing initial charging of a direct-current capacitor while suppressing inrush current without using a component having a high rating.

DESCRIPTION OF EMBODIMENTS

Figure 1:
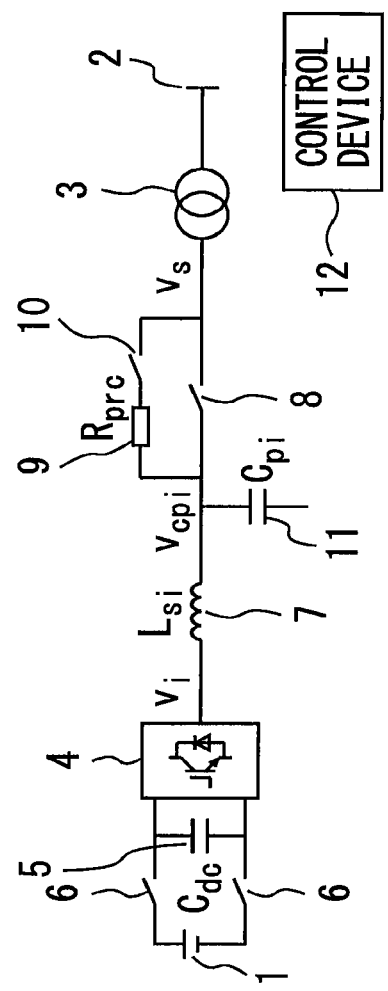
FIG. 1 is a configuration diagram of a system to which a power conversion system according to Embodiment 1 is applied.
Figure 1:
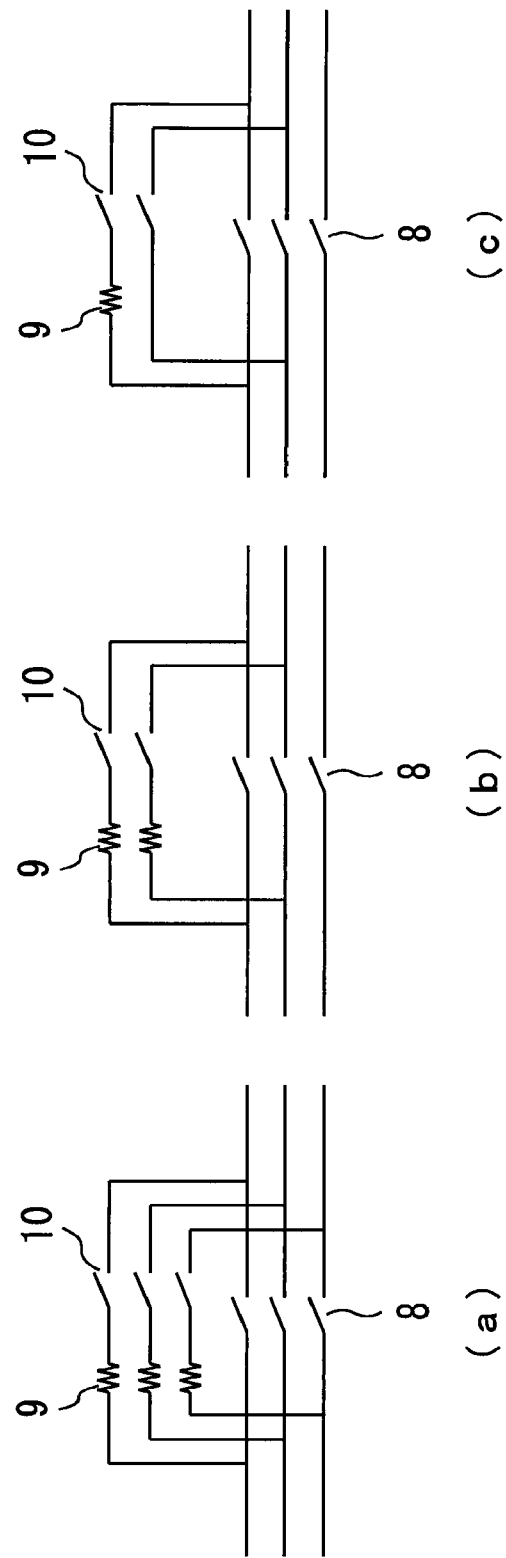

An embodiment of the present invention will be described with reference to the accompanying drawings. Note that in the drawings, parts that are identical or correspond to each other are provided with a same reference numeral. Overlapping descriptions of such parts will arbitrarily be simplified or omitted.

Embodiment 1

FIG. 1 is a configuration diagram of a system to which a power conversion system according to Embodiment 1 is applied.

In the upper part of FIG. 1, a direct-current power supply 1 is a photovoltaic facility. An alternate-current power supply 2 has three phases and is operated by, e.g., an electric power company. A transformer 3 is connected between the direct-current power supply 1 and the alternate-current power supply 2.

The power conversion system includes a power converter 4, a direct-current capacitor 5, direct-current switches 6, an alternate-current reactor 7, a first alternate-current switch 8 a charging resistance 9, a second alternate-current switch 10, an alternate-current capacitor 11 and a control device 12.

The power converter 4 is connected between the direct-current power supply 1 and the transformer 3. The direct-current capacitor 5 is connected between the direct-current power supply 1 and the power converter 4. The direct-current switches 6 are connected between the direct-current power supply 1 and the power converter 4.

The alternate-current reactor 7 is connected between the power converter 4 and the transformer 3. The first alternate-current switch 8 is connected between the alternate-current reactor 7 and the transformer 3. The charging resistance 9 is connected in parallel to the first alternate-current switch 8, between the alternate-current reactor 7 and the transformer 3. The second alternate-current switch 10 is connected in parallel to the first alternate-current switch 8 and in series to the charging resistance 9, between the alternate-current reactor 7 and the transformer 3. The alternate-current capacitor 11 is connected to the alternate-current reactor 7 side relative to the first alternate-current switch 8, the charging resistance 9 and the second alternate-current switch 10, on the output side of the power converter 4.

The first alternate-current switch 8, the charging resistance 9 and the second alternate-current switch 10 may have any of the forms in (a), (b) and (c) in the lower part of FIG. 1.

The control device 12 is provided so as to be capable of controlling the power converter 4, the direct-current switches 6, the first alternate-current switch 8 and the second alternate-current switch 10.

Next, a series of controls by the control device 12 will be described with reference to FIGS. 2 to 6.

Figure 2:
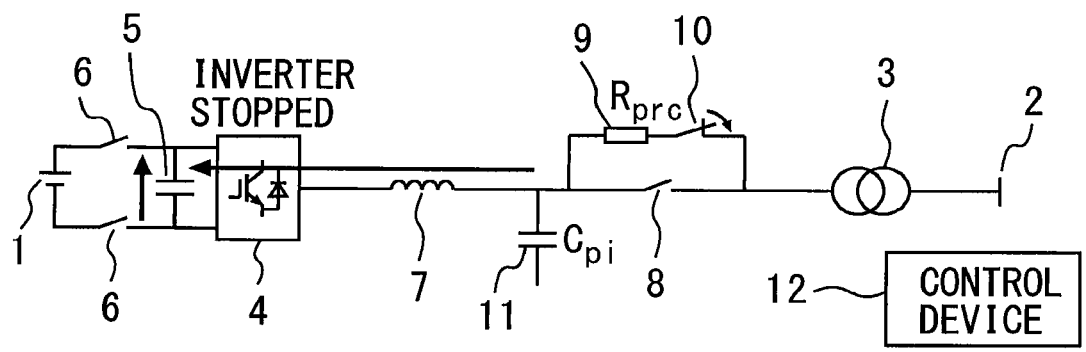
FIG. 2 is a diagram for describing a charging start mode provided by a control device in the power conversion system according to Embodiment 1.
Figure 3:
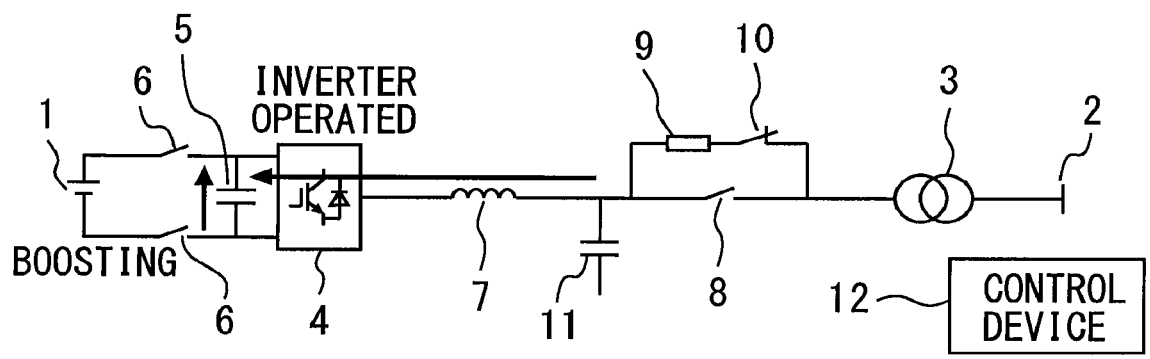
FIG. 3 is a diagram for describing a boost charging mode provided by the control device in the power conversion system according to Embodiment 1.
Figure 4:
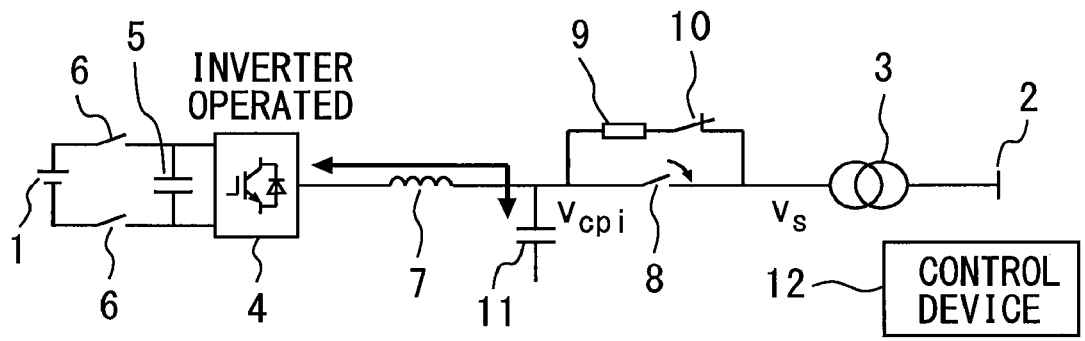
FIG. 4 is a diagram for describing an alternate-current voltage synchronization mode provided by the control device in the power conversion system according to Embodiment 1.
Figure 5:
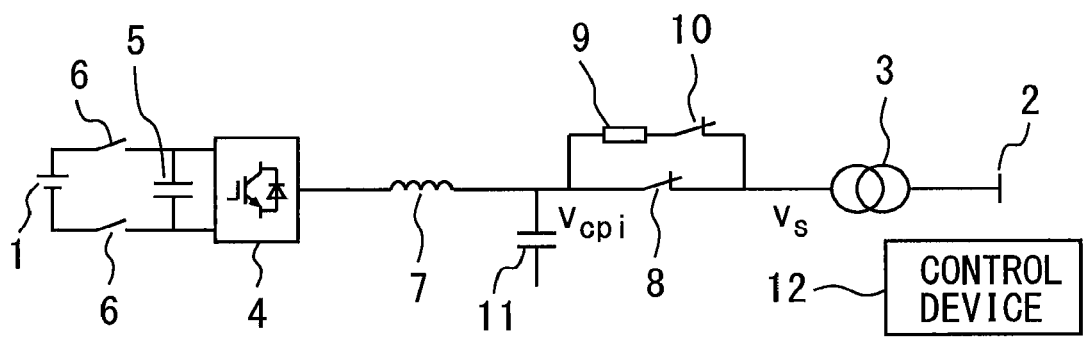
FIG. 5 is a diagram for describing a standby mode provided by the control device in the power conversion system according to Embodiment 1.
Figure 6:
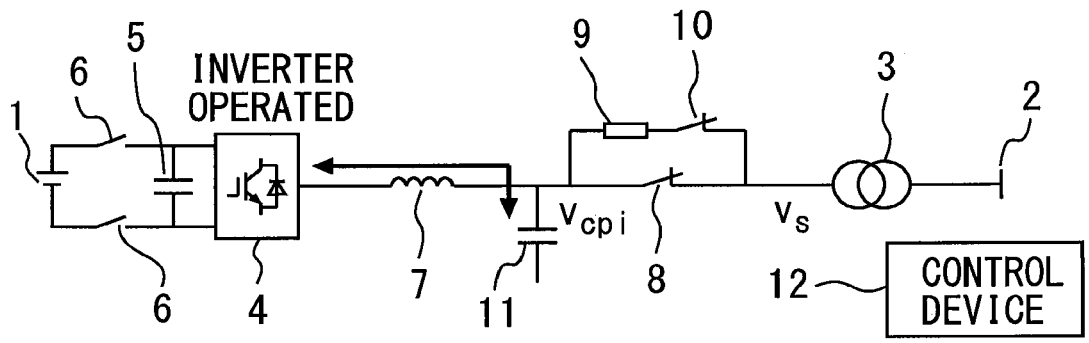
FIG. 6 is a diagram for describing an SVC operation mode provided by the control device in the power conversion system according to Embodiment 1.

FIG. 2 is a diagram for describing a charging start mode provided by a control device in the power conversion system according to Embodiment 1. FIG. 3 is a diagram for describing a boost charging mode provided by the control device in the power conversion system according to Embodiment 1. FIG. 4 is a diagram for describing an alternate-current voltage synchronization mode provided by the control device in the power conversion system according to Embodiment 1. FIG. 5 is a diagram for describing a standby mode provided by the control device in the power conversion system according to Embodiment 1. FIG. 6 is a diagram for describing an SVC operation mode provided by the control device in the power conversion system according to Embodiment 1.

The SVC (static var compensator) operation mode refers to an operation mode in which reactive power compensation is performed.

As illustrated in FIG. 2, in the alternate-current voltage synchronization mode, the control device 12 provides a state in which the direct-current switches 6 are open, the first alternate-current switch 8 is open and the power converter 4 is stopped, and closes the second alternate-current switch 10. At this time, an electrostatic capacitance $C_{dc}$ of the direct-current capacitor 5 is charged via the charging resistance 9. Where impedances of the transformer 3 and the alternate-current power supply 2 can be ignored, a direct-current voltage $V_i$ reaches approximately a value expressed by Expression (1) below.

[Math. 1]

$$V_1 = \frac{\sqrt{2}\, V_s}{\sqrt{1 + (3\omega R_{prc} C_{pi})^2}} \quad (1)$$

However, in Expression (1), ω is an angular speed corresponding to a frequency of the alternate-current power supply 2. $R_{prc}$ is a resistance value of the charging resistance 9. $C_{pi}$ is an electrostatic capacitance of the alternate-current capacitor 11. $V_s$ is a rated voltage of the alternate-current power supply 2.

Subsequently, as illustrated in FIG. 3, in the boost charging mode, the control device 12 controls the power converter 4 to perform boosting, and performs charging until the direct-current voltage $V_1$ reaches a preset value that is equal to or exceeds a value according to Expression (2) below.

[Math. 2]

$$V_1 = \sqrt{2}\, V_s \quad (2)$$

Subsequently, as illustrated in FIG. 4, in the alternate-current voltage synchronization mode, the control device 12 controls the power converter 4 to supply reactive power to the alternate-current side, and then, when a voltage $v_{cpi}$ applied to the alternate-current capacitor 11 has been brought into agreement with a present voltage $v_s$ of the alternate-current power supply 2, the control device 12 closes the first alternate-current switch 8.

Subsequently, as illustrated in FIG. 5, in the standby mode, the control device 12 performs control so that an output current of the power converter 4 becomes zero.

Subsequently, as illustrated in FIG. 6, in the SVC operation mode, the control device 12 controls the power converter 4 to compensate reactive power on the alternate-current side.

Next, charged power of the direct-current capacitor 5 in the boost charging mode will be described with reference to FIG. 7.

Figure 7:
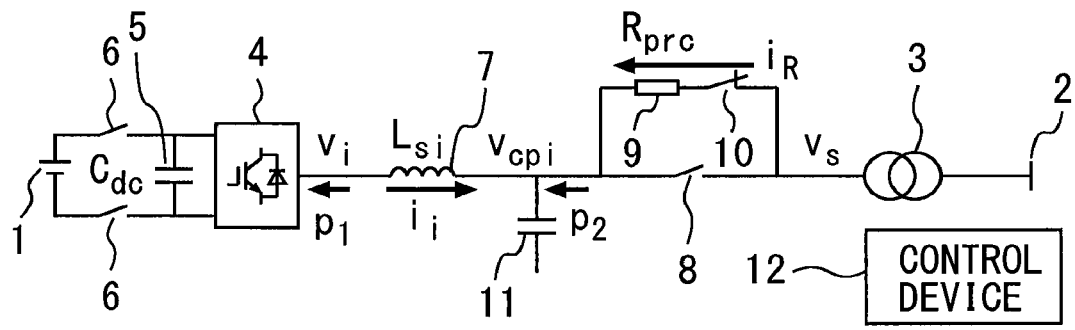
FIG. 7 is a diagram for describing charged power of a direct-current capacitor in the power conversion system according to Embodiment 1.

FIG. 7 is a diagram for describing charged power of a direct-current capacitor in the power conversion system according to Embodiment 1.

In FIG. 7, an instantaneous active power $p_2$ is expressed by Expression (3) below.

[Math. 3]

$$p_2 = v_{cpi} \cdot i_R = \frac{v_{cpi}(v_s - v_{cpi})}{R_{prc}} \quad (3)$$

However, in Expression (3), $i_R$ is a vector of current flowing in the charging resistance 9.

On dq coordinates fixed on a present voltage vector $v_s$ of the alternate-current power supply 2, the present voltage $v_s$ of the alternate-current power supply is expressed by Expression (4) below.

[Math. 4]

$$v_s = \begin{bmatrix} v_{sd} \\ o \end{bmatrix} = \begin{bmatrix} V_s \\ 0 \end{bmatrix} \quad (4)$$

On the dq coordinates fixed on the present voltage vector $v_s$ of the alternate-current power supply 2, the voltage $v_{cpi}$ applied to the alternate-current capacitor 11 is expressed by Expression (5) below.

[Math. 5]

$$v_{cpi} = \begin{bmatrix} v_{cpid} \\ v_{cpiq} \end{bmatrix} \quad (5)$$

On the dq coordinates fixed on the present voltage vector $v_s$ of the alternate-current power supply 2, the instantaneous active power $p_2$ is expressed by Expression (6) below.

[Math. 6]

$$p_2 = \frac{1}{R_{cpi}} \begin{bmatrix} v_{cpid} \\ v_{cpiq} \end{bmatrix} \cdot \begin{bmatrix} v_{sd} - v_{cpid} \\ v_{cpiq} \end{bmatrix} = \frac{v_{cpid}(v_{sd} - v_{cpid}) - v_{cpiq}^2}{R_{prc}} \quad (6)$$

Therefore, when the present voltage vector $v_s$ of the alternate-current power supply 2 satisfies Expression (7) below, the instantaneous active power $p_2$ reaches a maximum value expressed by Expression (8) below.

[Math. 7]

$$v_{cpi} = \begin{bmatrix} v_{cpid} \\ v_{cpiq} \end{bmatrix} = \begin{bmatrix} \frac{v_{sd}}{2} \\ 0 \end{bmatrix} \quad (7)$$

[Math. 8]

$$p_{2max} = \frac{v_{sd}^2}{4R_{prc}} \quad (8)$$

In the case of three-phase equilibrium, an instantaneous active power $p_1$ is equal to the instantaneous active power $p_2$. Therefore, the charged power of the direct-current capacitor 5 can be controlled by manipulating the voltage vector $V_{cpi}$ applied to the alternate-current capacitor 11.

Also, power consumption of the charging resistance 9 can be obtained by Expression (9) below.

[Math. 9]

$$p_R = \frac{|v_s - v_{cpi}|^2}{4R_{prc}} = \frac{(v_{sd} - v_{cpid})^2 - v_{cpid}^2}{R_{prc}} \quad (9)$$

The instantaneous active power $p_2$ is symmetrical with respect to $v_{sd}$. When $0 < v_{cpid} < v_{sd}/2$, the instantaneous active power $p_1$ is smaller than power consumption $P_R$ of the charging resistance 9. When $v_{sd}/2 < v_{cpid} < v_{sd}$, the instantaneous active power $p_1$ is larger than the power consumption $p_R$ of the charging resistance 9.

Therefore, for charging of the direct-current capacitor 5, it is preferable that $v_{cpid}$ be within a range of $v_{sd}/2 < v_{cpid} < v_{sd}$.

Next, control during the boost charging mode will be described with reference to FIG. 8.

Figure 8:
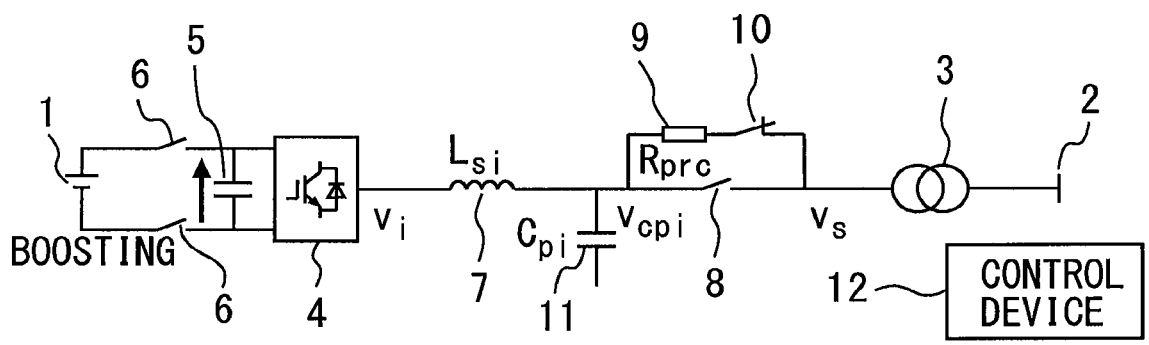
FIG. 8 is a diagram for describing control during the boost charging mode in the power conversion system according to Embodiment 1.

FIG. 8 is a diagram for describing control during the boost charging mode in the power conversion system according to Embodiment 1.

In many cases, an impedance $L_{si}$ of the alternate-current reactor 7 for a frequency f of the alternate-current power supply 2 is sufficiently small in comparison with a complex impedance of the electrostatic capacitance $C_{pi}$ of the alternate-current capacitor 11 and the resistance value $R_{pre}$ of the charging resistance 9. Therefore, if current $i_i$ flowing in the charging resistance 9 is not so large, the voltage $v_{cpi}$ applied to the alternate-current capacitor 11 agrees with an output voltage $v_i$ of the power converter 4. At this time, the control device 12 sets a voltage instruction value $v_i^*$ for the power converter 4 to a value expressed by Expression (10) below.

[Math. 10]

$$v_i^* = \left(1 - \frac{k}{2}\right)v_s \quad (10)$$

However, k is adjusted within a range of no less than 0 but no more than 1. Where k is 1, the direct-current capacitor 5 is charged with substantially theoretical maximum power. Where k is 0, the direct-current capacitor 5 is not charged.

In normal charging, in the direct-current capacitor 5, charging of the direct-current capacitor 5 is performed with k set to 1. If charged power is excessively large or if power consumption of the charging resistance 9 is excessively large, charging of the direct-current capacitor 5 is performed with k appropriately adjusted.

Next, control during the alternate-current voltage synchronization mode will be described with reference to FIG. 9.

Figure 9:
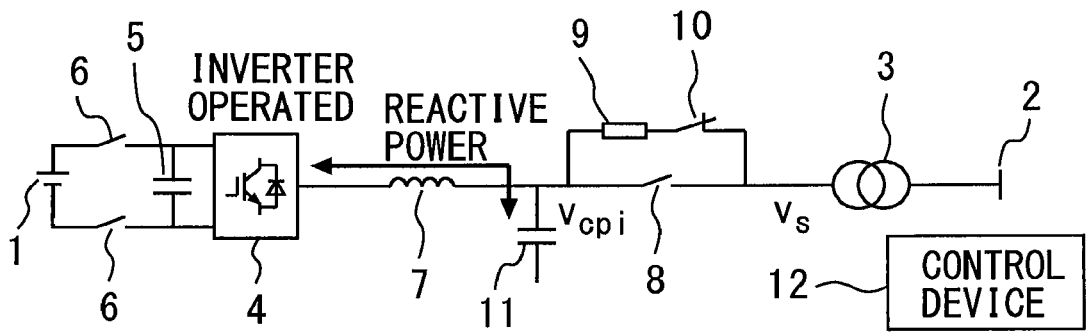
FIG. 9 is a diagram for describing control during the alternate-current voltage synchronization mode in the power conversion system according to Embodiment 1.

FIG. 9 is a diagram for describing control during the alternate-current voltage synchronization mode in the power conversion system according to Embodiment 1.

In Expression (10), where k is 0, Expression (11) below holds.

[Math. 11]

$$v_i^* = v_s \approx v_{cpi} \quad (11)$$

At this time, the power converter 4 supplies only reactive power in order to bring the voltage $v_{cpi}$ applied to the alternate-current capacitor 11 into agreement with the present voltage $v_s$ of the alternate-current power supply 2. In theory, no active power is required and thus the direct-current voltage is not lowered.

If the first alternate-current switch 8 is closed when the voltage $v_{cpi}$ applied to the alternate-current capacitor 11 has been brought into agreement with the present voltage $v_s$ of the alternate-current power supply 2, preparation for SVC operation is completed without generation of inrush current.

Next, an overview of operation of the control device 12 will be described with reference to FIG. 10.

Figure 10:
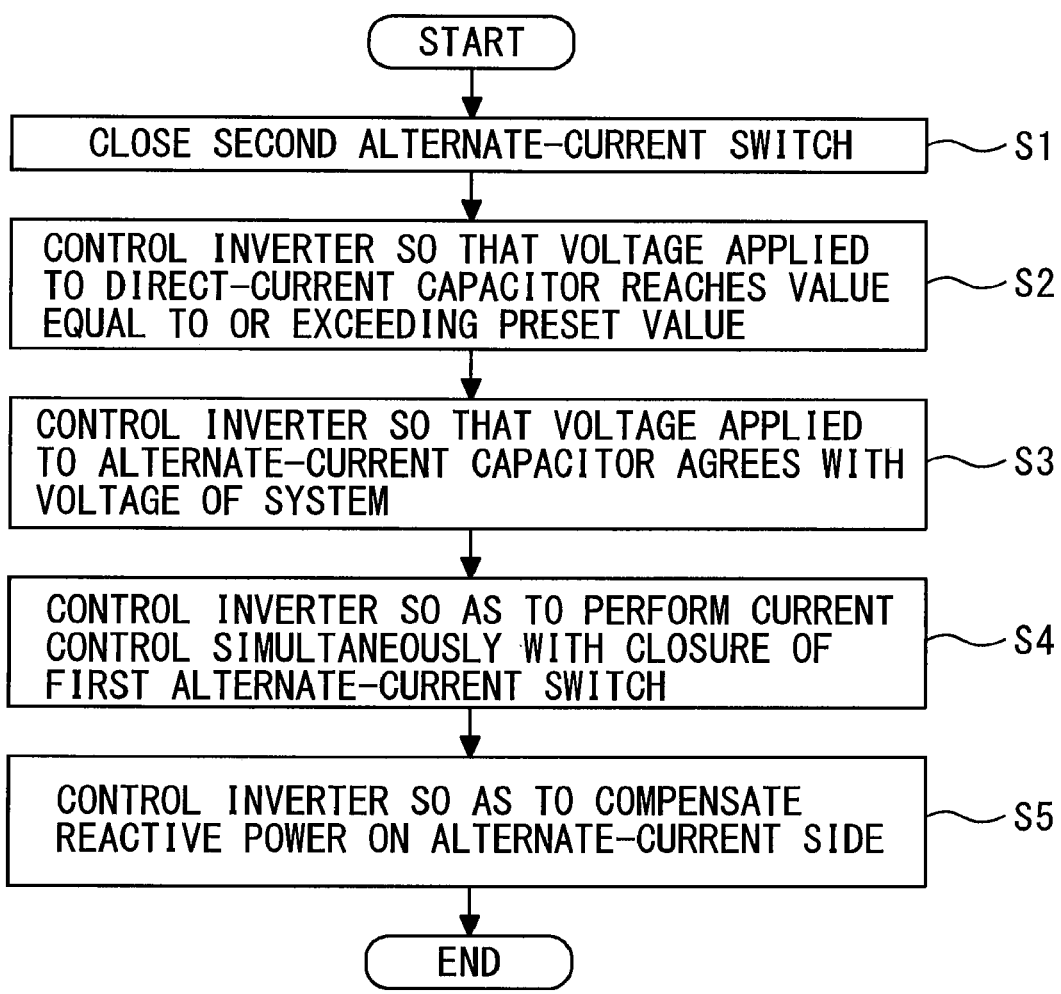
FIG. 10 is a flowchart for describing an overview of operation of the control device in the power conversion system according to Embodiment 1.

FIG. 10 is a flowchart for describing an overview of operation of the control device in the power conversion system according to Embodiment 1.

In step S1, the control device 12 closes the second alternate-current switch 10. Subsequently, the control device 12 performs operation in step S2. In step S2, the control device 12 controls the power converter 4 so that a voltage applied to the direct-current capacitor 5 reaches a value that is equal to or exceeds a present value. Subsequently, the control device 12 performs operation in step S3. In step S3, the control device 12 controls the power converter 4 so that a voltage applied to the alternate-current capacitor 11 agrees with a voltage of the alternate-current power supply 2. Subsequently, the control device 12 performs operation in step S4. In step S4, the control device 12 controls the power converter 4 so that an output current becomes zero simultaneously with closing of the first alternate-current switch 8. Subsequently, the control device 12 performs operation in step S5. In step S5, the control device 12 controls the power converter 4 so as to compensate reactive power on the alternate-current side.

According to Embodiment 1 described above, the control device 12 provides a state in which the direct-current switches 6 are open, the first alternate-current switch 8 is open, the second alternate-current switch 10 is closed and the power converter 4 is stopped, and controls the power converter 4 so that the voltage applied to the direct-current capacitor 5 reaches a value that is equal to or exceeds the preset voltage. Therefore, it is possible to perform initial charging of the direct-current capacitor 5 while suppressing inrush current without using a component having a high rating.

Also, the control device 12 controls the power converter 4 so that the voltage applied to the alternate-current capacitor 11 agrees with the voltage of the alternate-current power supply 2. Subsequently, the control device 12 closes the first alternate-current switch 8. Therefore, it is possible to suppress inrush current flowing in the alternate-current capacitor 11.

Note that controlling the power converter 4 so that the voltage applied to the direct-current capacitor 5 agrees with the voltage of the direct-current power supply 1 and then closing the direct-current switches 6 enables suppressing inrush current flowing in the direct-current capacitor 5 when closing the direct-current switches 6.

Also, in a state in which the direct-current switches 6 are open and the first alternate-current switch 8 is closed, the control device 12 controls the power converter 4 so as to compensate reactive power on the alternate-current side. Therefore, reactive power on the alternate-current side can be compensated with suppression of inrush current at the time of initial charging of the direct-current capacitor 5.

Note that a storage battery may be used as the direct-current power supply 1. In this case, the direct-current switches 6 may be closed after controlling the power converter 4 so that the voltage applied to the direct-current capacitor 5 agrees with a charged voltage of the storage battery, following the standby mode or the alternate-current voltage synchronization mode. In this case, also, inrush current flowing in the direct-current capacitor 5 when closing the direct-current switches 6 can be suppressed.

Also, as an inrush current suppressor, a charging reactor may be used instead of the charging resistance 9. In this case, also, it is possible to perform initial charging of the direct-current capacitor 5 while suppressing inrush current without using a component having a high rating.

Also, in principle, the charging start mode is not necessary. Therefore, the mode may transition to the boost charging mode simultaneously with closure of the second alternate-current switch 10. In this case, power consumption of the charging resistance 9 may be suppressed.

Also, in the alternate-current voltage synchronization mode, if inrush current rushing in the alternate-current capacitor 11 can be allowed, the switch 8 may be turned on before the voltages of the alternate-current capacitor 11 and the alternate-current power supply 2 are brought into agreement with each other.

Also, the mode may transition from the alternate-current voltage synchronization mode to the SVC operation mode without involving the standby mode.

Also, the direct-current switches 6 may be left consistently on. Also, the direct-current power supply and the direct-current side of the power converter may directly be connected with no direct-current switches 6 provided.

Also, the direct-current power supply and the direct-current side of the power converter may be connected via a backflow prevention semiconductor device such as a diode, with no direct-current switches 6 provided.

Also, the present invention is applicable even if no alternate-current capacitor 11 is provided.

Also, the alternate-current power supply 2 may be a single-phase power supply and the power converter 4 may be a single-phase power converter. In this case, in the boost charging mode, where a present voltage $v_s$ of the single-phase power supply satisfies Expression (12) below, the instantaneous active power $p_2$ reaches a maximum value expressed by Expression (13) below.

[Math. 12]

$$v_{cpi} = \frac{v_s}{2} \qquad (12)$$

[Math. 13]

$$p_{2_{max}} = \frac{v_s^2}{4R_{prc}} \qquad (13)$$

Next, an example of the control device 12 will be described with reference to FIG. 11.

Figure 11:
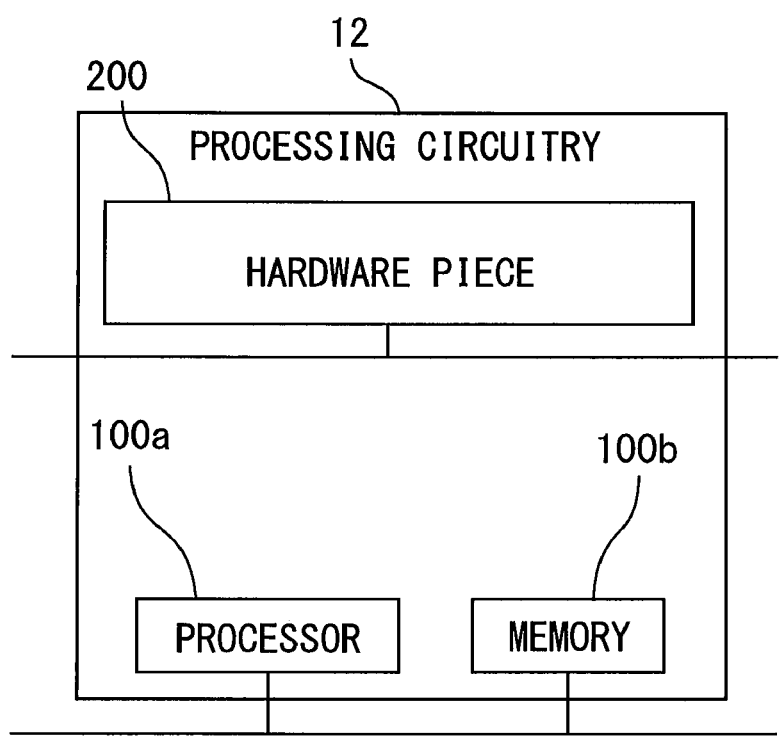
FIG. 11 is a hardware configuration diagram of the control device in the power conversion system according to Embodiment 1.

FIG. 11 is a hardware configuration diagram of the control device in the power conversion system according to Embodiment 1.

Each of functions of the control device 12 can be implemented by processing circuitry. For example, the processing circuitry includes at least one processor 100a and at least one memory 100b. For example, the processing circuitry includes at least one dedicated hardware piece 200.

Where the processing circuitry includes at least one processor 100a and at least one memory 100b, each of the functions of the control device 12 is implemented by software, firmware or a combination of software and firmware. At least one of the software and the firmware is described in the form of programs. At least one of the software and the firmware is stored in the at least one memory 100b. The at least one processor 100a implements respective functions of the control device 12 by reading and executing the programs stored in the at least one memory 100b. The at least one processor 100a is also referred to as a central processing unit, a processing device, an arithmetic device, a microprocessor, a microcomputer or a DSP. For example, the at least one memory 100b is a non-volatile or volatile semiconductor memory such as a RAM, a ROM, a flash memory, an EPROM or a EEPROM, a magnetic disk, a flexible disk, an optical disk, a compact disc, a mini-disk or a DVD.

Where the processing circuitry includes the at least one dedicated hardware piece 200, the processing circuitry is implemented by, for example, a single circuit, a complex circuit, a programmed processor, a parallel-programmed processor, an ASIC, an FPGA or any of combinations thereof. For example, the functions of the control device 12 are implemented by respective processing circuits. For example, the functions of the control device 12 are collectively implemented by the processing circuitry.

Some of the functions of the control device 12 may be implemented by the dedicated hardware piece 200 and others of the functions may be implemented by the software or the firmware. For example, a function that controls the power converter 4 may be implemented by the processing circuitry serving as the dedicated hardware piece 200 and the functions other than the function that controls the power converter 4 may be implemented by the at least one processor 100a reading and executing programs stored in the at least one memory 100b.

As described above, the processing circuitry implements each of the functions of the control device 12 by means of the hardware piece 200, the software, the firmware or any of combinations thereof.

INDUSTRIAL APPLICABILITY

As described above, a power conversion system according to the present invention can be used for a system that suppresses inrush current.

REFERENCE SIGNS LIST

1 direct-current power supply, 2 alternate-current power supply, 3 transformer, 4 power converter, 5 direct-current capacitor, 6 direct-current switch, 7 alternate-current reactor, 8 first alternate-current switch, 9 charging resistance, 10 second alternate-current switch, 11 alternate-current capacitor, 12 control device, 100a processor, 100b memory, 200 hardware piece

The invention claimed is:

1. A power conversion system comprising:
a power converter connected to an alternate-current power supply;
a direct-current capacitor connected to a direct-current side of the power converter;
a first alternate-current switch connected between the power converter and the alternate-current power supply;
an inrush current suppressor connected in parallel to the first alternate-current switch, between the power converter and the alternate-current power supply, the inrush current suppressor including a charging resistance or a charging reactor;
a second alternate-current switch connected in parallel to the first alternate-current switch and in series to the inrush current suppressor, between the power converter and the alternate-current power supply;
an alternate-current capacitor connected on the power converter side relative to the first alternate-current switch, the inrush current suppressor and the second alternate-current switch, between the power converter and the alternate-current power supply; and
a control device configured to control the power converter so that the first alternate-current switch is open, the second alternate-current switch is closed and subsequently the voltage applied to the direct-current capacitor reaches a voltage that is equal to or exceeds the preset voltage, subsequently controls the power converter so that the voltage applied to the alternate-current capacitor substantially equals a voltage of the alternate-current power supply, and subsequently closes the first alternate-current switch.

2. The power conversion system according to claim 1, wherein a direct-current power supply is connected to the direct-current side of the power converter via a direct-current switch, and the control device controls the power converter so that the direct-current switch is open and the voltage applied to the direct-current capacitor agrees with a voltage of the direct-current power supply, and subsequently closes the direct-current switch.

3. The power conversion system according to claim 2, wherein:
the power converter is connected between a photovoltaic facility that is the direct-current power supply, and the alternate-current power supply; and
the control device controls the power converter so as to compensate reactive power on an alternate-current side in a state in which the first alternate-current switch is closed.

4. The power conversion system according to claim 2, wherein:
the power converter is connected between a storage battery that is the direct-current power supply, and the alternate-current power supply; and
the control device controls the power converter so that the direct-current switch is open, the first alternate-current switch is open, the second alternate-current switch is closed and the voltage applied to the direct-current capacitor substantially equals a charged voltage of the storage battery, and subsequently closes the direct-current switch.

\* \* \* \* \*